No. 693,722. Patented Feb. 18, 1902.
V. KOREJS & J. KHEBL.
SEEDING MACHINE.
(Application filed Feb. 8, 1900.)
(No Model.) 4 Sheets—Sheet 1.

Witnesses:
Geo. T. May Jr.
C. E. Merriam

Inventors:
Vaclav Korejs and
Josef Khebl.
By J. S. Barker and
C. A. Brandenburg
Attys.

No. 693,722. Patented Feb. 18, 1902.
V. KOREJS & J. KHEBL.
SEEDING MACHINE.
(Application filed Feb. 8, 1900.)
(No Model.) 4 Sheets—Sheet 2.

No. 693,722. Patented Feb. 18, 1902.
V. KOREJS & J. KHEBL.
SEEDING MACHINE.
(Application filed Feb. 8, 1900.)
(No Model.) 4 Sheets—Sheet 3.
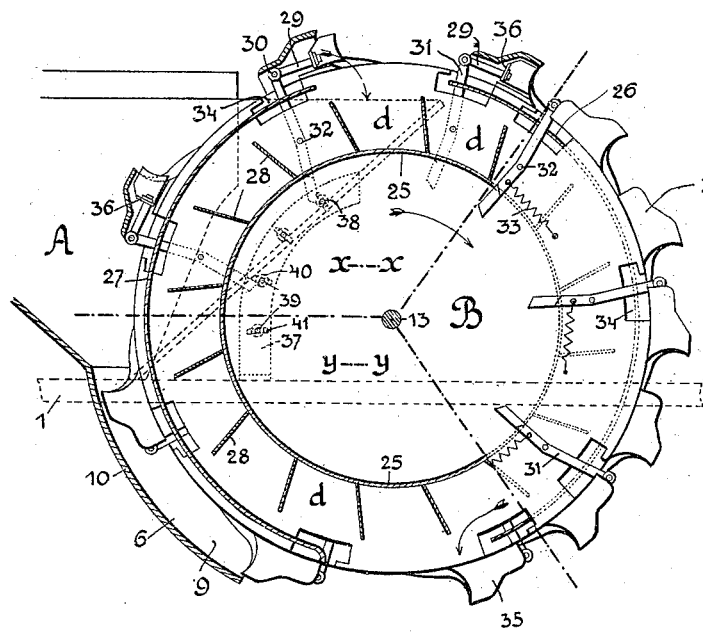
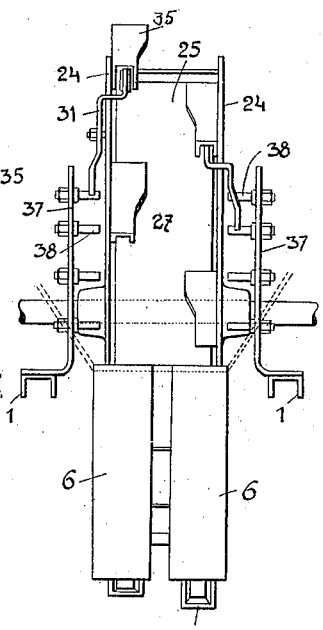
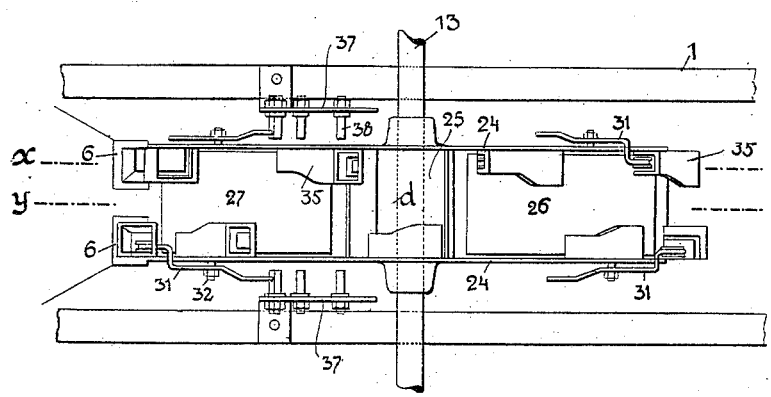
Witnesses
Geo. J. May, Jr.
C. E. Merriam
Inventors
Vaclav Korejs and Josef Khebl
By J. S. Barker and
C. A. Brandenburg
Attorneys No. 693,722. Patented Feb. 18, 1902.
V. KOREJS & J. KHEBL.
SEEDING MACHINE.
(Application filed Feb. 8, 1900.)

(No Model.) 4 Sheets—Sheet 4.

Witnesses:

Inventors:
Václav Korejs and Josef Khebl
By J. S. Barker and
C. A. Brandenburg
Attorneys.

THE NORRIS PETERS CO., PHOTO-LITHO., WASHINGTON, D. C.

UNITED STATES PATENT OFFICE.

VACLAV KOREJS AND JOSEF KHEBL, OF ALT-BUNTZLAU, AUSTRIA-HUNGARY.

SEEDING-MACHINE.

SPECIFICATION forming part of Letters Patent No. 693,722, dated February 18, 1902.

Application filed February 8, 1900. Serial No. 4,577. (No model.)

*To all whom it may concern:*

Be it known that we, VACLAV KOREJS and JOSEF KHEBL, subjects of the Emperor of Austria-Hungary, residing at Alt-Buntzlau, in the Province of Bohemia, Austria-Hungary, have invented certain new and useful Improvements in Seeding and Planting Machines for Potatoes, of which the following is a specification.

The present invention relates to a machine for sowing or planting seed-potatoes, and its essential features are as set forth in the following description.

Figure 1:
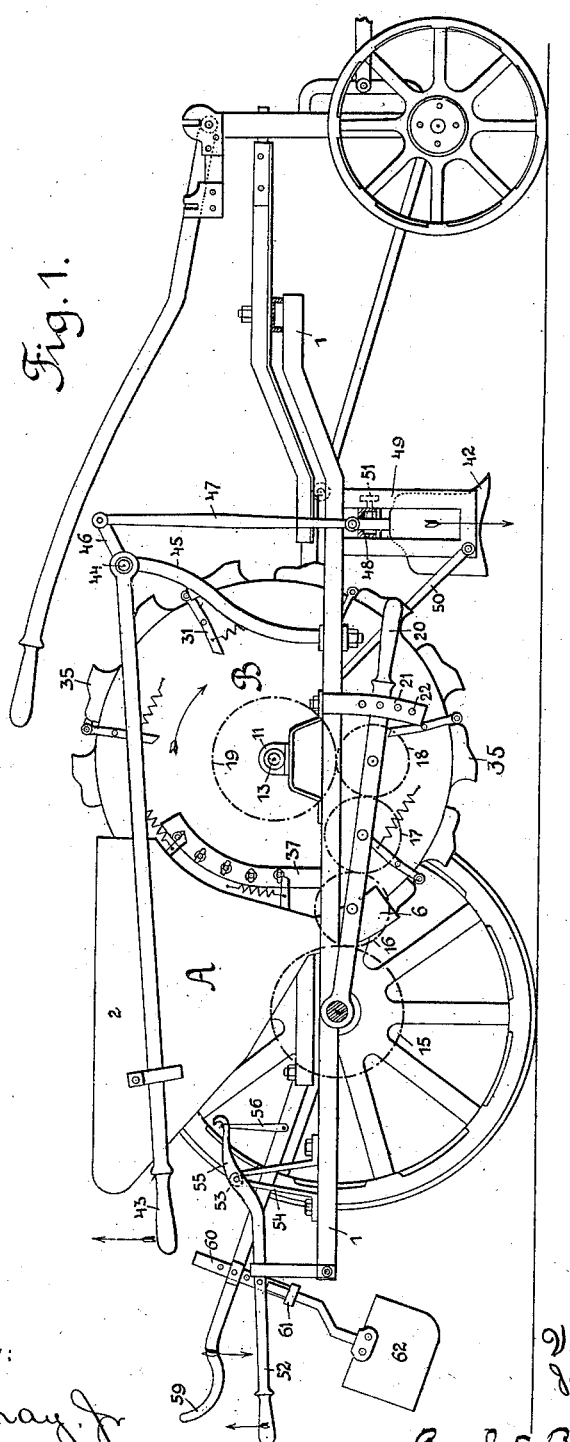
Figure 2:
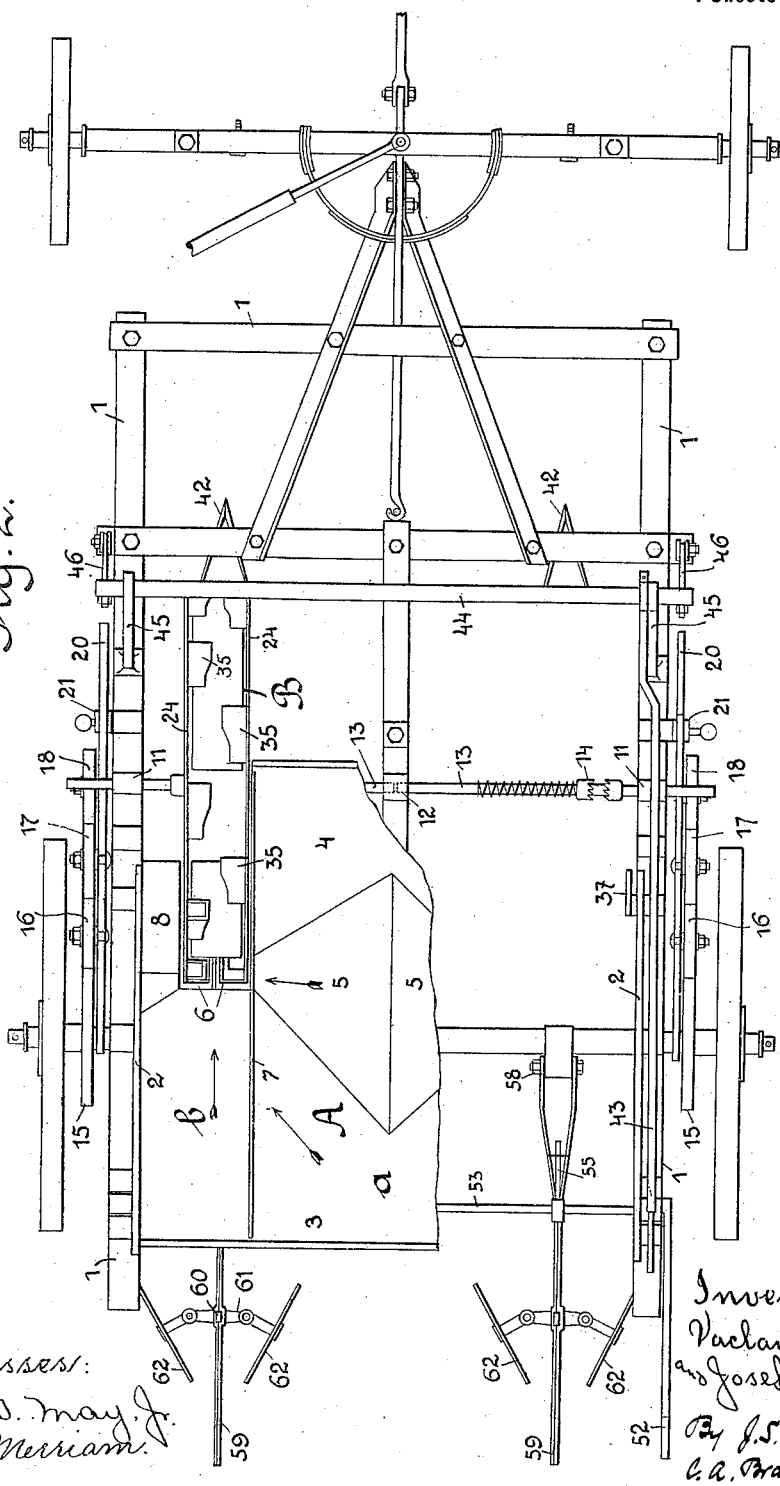
Figure 8:
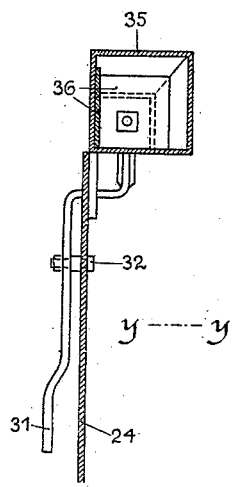
Figure 7:
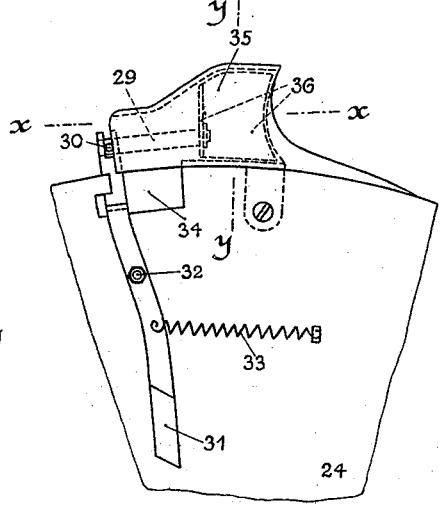
Figure 9:
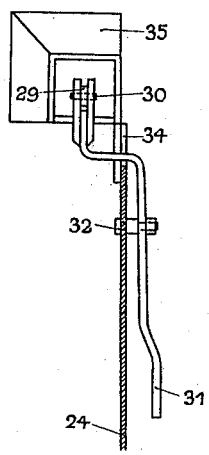
Figure 10:
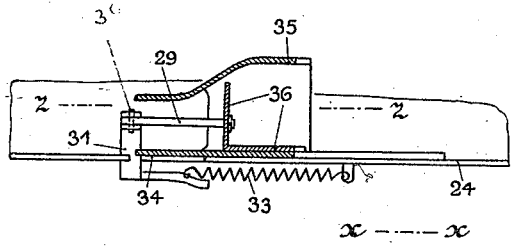
Figure 6:
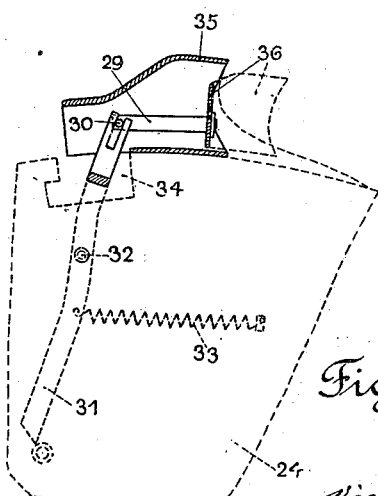

In the accompanying drawings, Figure 1 is a side elevation of a machine embodying our invention. Fig. 2 is a top plan view of the same, parts of the machine being broken away. Fig. 3 is a side view, partly in elevation, partly in section on line $x\ x$ and partly in section on line $y\ y$ of Fig. 5, of the seeding mechanism. Fig. 4 is a rear elevation, and Fig. 5 a top plan view, of the same. Fig. 6 is a vertical section on the line $z\ z$ of Fig. 10. Fig. 7 is a detail view, in side elevation, of a portion of the seeding-disk, showing the arrangement of a seed-scoop. Fig. 8 is a vertical section of the same on the line $y\ y$ of Fig. 7. Fig. 9 is a rear elevation of the same. Fig. 10 is a sectional view of such feeding-scoop, taken on line $x\ x$ of Fig. 7.

The invention consists, essentially, of the combined scooping and seeding disk B, a seedbox A, a device for forming the furrows in the ground, a device for closing the furrows, and a transportable frame. The machine illustrated in the drawings is constructed for two rows and has two seeding-wheels; but as the two sides of the machine are precisely similar to each other the following description will treat principally of one side only of the machine.

On the main frame 1, mounted on the wagon-frame, is located the seedbox A, composed of the walls 2, 3, and 4. The walls 3 and 4 are inclined, a roof-piece 5 being fitted between the same, which gives a taper to the box A, ending in a passage 6. The box A is also divided into three divisions by two partitions 7, (only one of such partitions being shown, Fig. 2,) open underneath for the protection of the planting-disks B, the center division $a$ being the largest and serving as a store-chamber, in which the seed-potatoes are placed. Between the planting-disk B and the side 2 of the seedbox is a metal wall 8 for effecting a proper closing or cut-off of the box A.

The seed-potatoes which are in the box A roll down the inclined divisions or walls 3, 4, and 5 into the outer compartments $b$ and pass on toward the passage 6, which is formed by two side walls 9 and a bottom 10. (See Fig. 3.)

The scooping and planting or discharging disks B B, which reach into the box A, are loosely mounted on shafts 13, supported in bearings 11 and 12, and are driven forward, as indicated by the arrows in Figs. 1 and 3, by a toothed coupling or gear-clutch 14, operating under a spring-pressure, so that in the reverse motion only the shaft 13 is turned, the disk B remaining stationary. Each of the shafts 13 is driven from the wheel-hub 15 by a train of gears 16 to 19.

The scooping and planting devices for each row are united in a single wheel B, comprising two parallel upright disks 24, each provided with a series of scoops 35 on its periphery and united by a transverse rim 25, located a suitable distance within the peripheries of the disks. The annular space between the disks and the rim is divided by transverse partitions 28 into a series of compartments $d\ d$, as shown in Fig. 3. The disks 24, with the scoops C and 35, form the scooping device proper, while the rim 25, with the compartments $d$, forms the discharging device. Each scoop 35 is provided with a movable bottom 36, the bottom being connected with a double-armed lever 31 by means of an arm 29 and bolt 30. The said lever 31 passes through a slot 34 in the disk 24 to the other side thereof, where it is mounted on a pivot 32 and is held under pressure by a spiral spring 33. The rim 25 is partially surrounded or inclosed by stationary border-pieces 26 and 27, so as to be closed in by the same, openings being left only at the top and bottom. The scoops 35 serve for scooping and transporting the seeds to the given level, where the seeds are emptied into compartments $d$. With this object the scoops pass first through the passage or channel 6, which is filled with seed-potatoes, so that the scoop takes up at least one potato-seed. After passing beyond the passage or channel 6 the scoops arrive in a compartment *b* of the seedbox proper, and during the passage through the same other seeds may be taken up by the scoops. As it is desired, however, that each scoop should take the one seed from the seedbox *b*, the other seeds have to be removed therefrom. This is effected by means of the movable bottom 36 of the scoop, previously mentioned, which is given a vibratory motion in such a manner that the superfluous seed heaped upon the scoop are shaken off, falling back into the seedbox. This movement of the movable bottom 36 is effected by the sliding of the free end of the lever 31 over a series of pins 38. These pins are attached to the standards 37, and each consists of a shaft 39, provided with a roller 40 and movable in a slot 41 to permit of proper adjustment. Owing to this vibration only a single potato-seed remains in the scoop, it being held therein by reason of the shape and construction of the bottom 36. This seed-potato is carried up to the highest point of the disk and is there thrown out of the scoop by the contact of the lever 31 with one of the pins 38, so that it falls into a corresponding compartment *d* of the rim. This rim divided into compartments *d* serves to distribute the seeds uniformly in the furrows, and for this purpose is partially covered with a cover or border 26, so that the seeds can only fall out of the compartments when the same arrive in proper position.

The furrows in which the seed-potatoes fall are formed by plowshares 42, which are adjustable by means of screws 51. These shares are carried by rods 47, attached to the arms 46, which extend from a shaft 44, journaled in the standards 45. The shaft 44 is provided with an operating handle or lever 43. The shares 42 are mounted in guide-frames 49, so as to permit of vertical movement, and are held against lateral movement by plates 48. By these means the shares may be raised or lowered by the manipulation of the lever 43. The braces 50 serve to stiffen the guide-frames 49.

The device for closing the furrows consists of two metal plates 62, which are connected by means of arms 60 and cross-bars 61 with a movable bar or carrier 59. These plates 62 are raised by pressing down upon a lever 52, fulcrumed upon the shaft 53, and connected at its inner end 55 by a link 56 with the bar 59, which is fulcrumed at 58.

In order to plant the potatoes at a greater or less distance apart, as may be desired, the gear-wheels 16 to 18 are mounted on a lever-arm 20. This arm turns about the axle of the rear wheel as an axis, and its other end is adjustably connected with the guide piece or standard 21 by means of pins 22 or in any other preferred manner. By altering the position of the lever-arm 20 different sizes of gears may be fitted upon the shaft 13 to give the latter the desired speed. By moving the lever 20 to disconnect the gears 18 and 19 the seeding-disk may be allowed to remain stationary.

The potato planting-machine described might be used with two or more disks, so as to plant potatoes in several furrows at a time, and the planting and scooping device might also be combined in different ways. For instance, two scooping devices and one planting or discharging device could be combined, in which case the latter device (the rim 25) would serve the other two, or two planting devices could be combined with one scooping device, in which case the latter would be fed from both sides.

What we claim is—

1. In a potato seeding and planting machine, the combination with a seedbox, of a rotating part provided with means for extracting seeds from the seedbox, means concentric with the said rotating part provided with compartments arranged to receive the seeds from the rotating part after they have been taken from the seedbox, and means for conveying the seeds from the said compartments to the furrow, substantially as set forth.

2. In a potato-seeding machine, the combination with a seedbox, of a disk provided with seed-scoops arranged to receive the seeds from the box and discharge them at a given point, said disk having a rim divided into compartments adapted to receive the seeds discharged by the scoops and convey them to the point from which they are dropped into the furrow, substantially as set forth.

3. In a potato-seeding machine, the combination with a seedbox, of a disk provided with a plurality of seed-scoops arranged to receive the seeds from said box and convey them to a predetermined point, means for discharging the seeds at such point, and means carried by the disk for conveying the seeds from such point of discharge to the point from which said seeds are dropped into the furrow, substantially as set forth.

4. In a potato-seeding machine, the combination with the seedbox of a disk provided with scoop devices arranged to receive seeds from said box, and convey them to a predetermined point, a rim situated within the circle described by the said scoop devices and divided into compartments adapted to receive the seeds discharged by the scoop devices, and means for retaining the seeds in such compartments until a predetermined point of discharge is reached, and then allowing them to fall into the furrow, substantially as set forth.

5. In a potato-seeding machine, the combination with the seedbox of a revolving disk provided with a plurality of seed-scoops, each of said scoops being provided with a movable bottom, and means for imparting to said movable bottoms a vibratory motion, substantially as set forth.

6. In a potato-seeding machine, the combination with a seedbox, of a seeding-disk provided with a series of seed-scoops adapted to enter the said seedbox and extract seeds therefrom, means arranged within the scoops for removing superfluous seeds from said scoops, and means for distributing said seeds regularly in the furrows, substantially as set forth.

7. In a potato-seeding machine, the combination with the seed-distributing disk, of a plurality of seed-scoops carried by said distributing-disk, each of said scoops being provided with a movable bottom, and a spring-held lever operatively connected thereto, and means for imparting to said lever a vibratory motion, substantially as set forth.

8. In a potato-seeding machine, the combination with a rotating seeding-disk, of a seed-scoop carried thereby, said scoop having a movable bottom, a two-armed lever pivoted to said disk, connections between one end of said lever and the movable bottom, devices extending into the path of the other arm to move the same in one direction, and spring devices for moving said arm in the opposite direction, substantially as set forth.

9. In a potato-seeding machine, the combination with the frame, the wheels, a seedbox, a seeding-wheel, and its driving-shaft, of a gear carried by the driving-wheel, a pinion carried by the said shaft, idlers for communicating motion from the gear-wheel to the pinion, means for throwing said idlers into and out of mesh with said pinion, and means for holding in fixed position the said idlers in the positions to which they may be moved, whereby a pinion of larger or smaller size may be employed in order to change the speed of the driving-shaft, substantially as set forth.

In testimony whereof we affix our signatures in presence of two witnesses.

VACLAV KOREJS.
JOSEF KHEBL.

Witnesses:
ADOLPH FISCHER,
NILOSLAV HRUBY.